Aug. 24, 1948.　　　F. J. TIPPEN　　　2,447,825
PRESSURE FLUID SERVOMOTOR
Filed June 30, 1943　　　　　　　　　　2 Sheets-Sheet 1
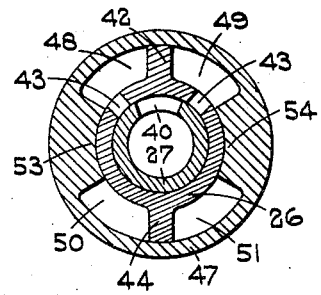
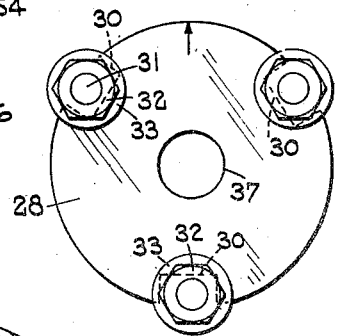
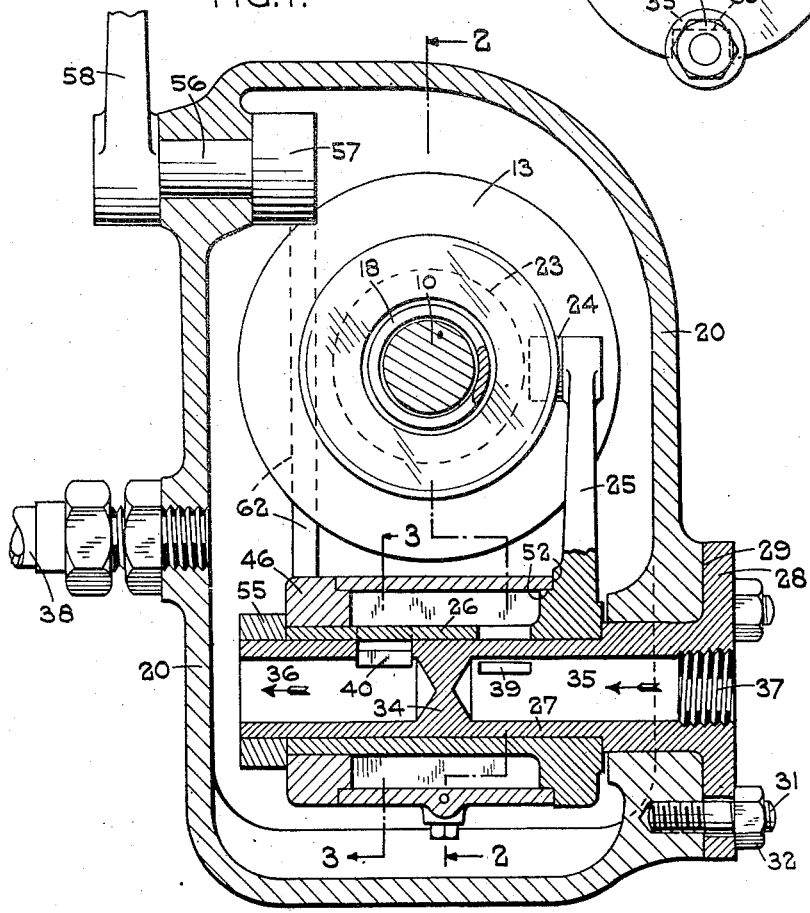
INVENTOR.
Frank John Tippen
BY Henry J. Lucke
ATTORNEY.

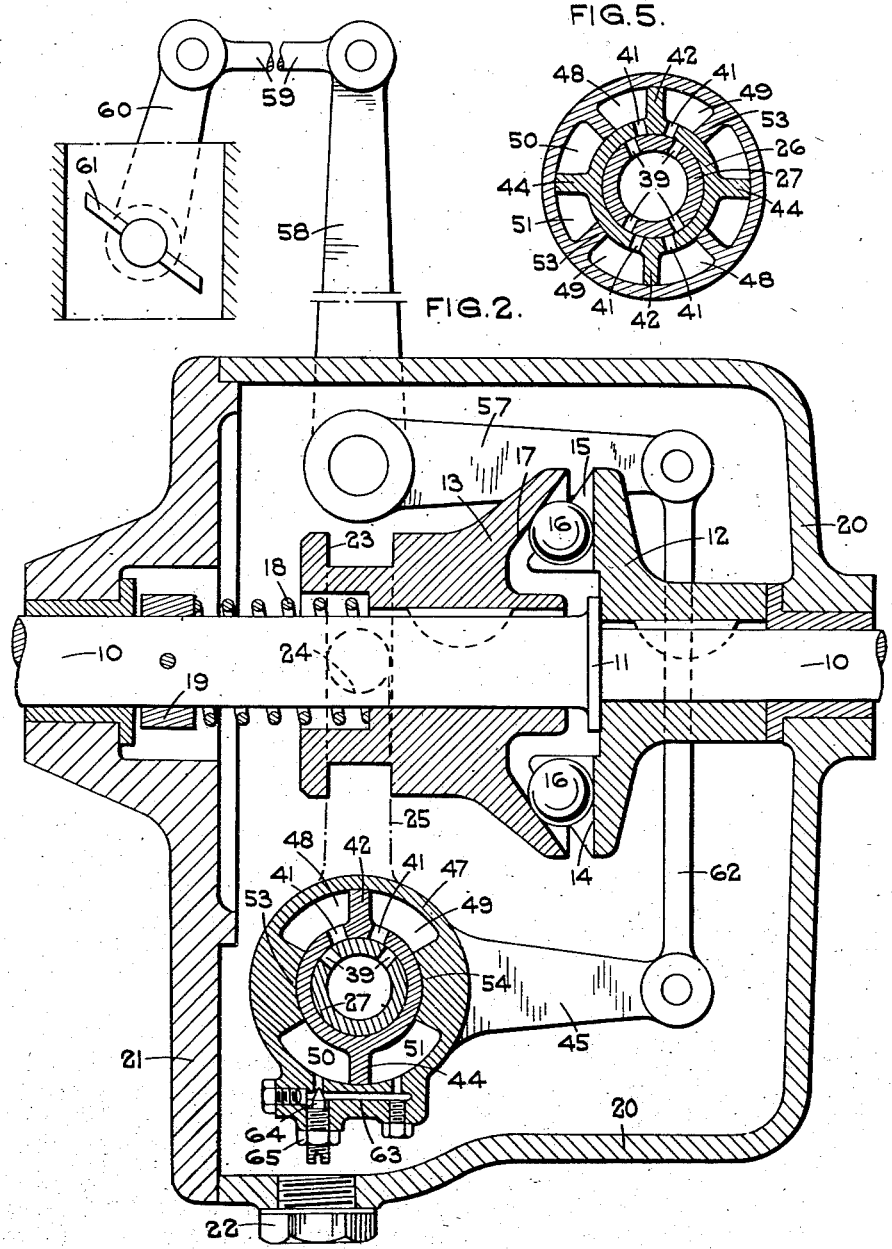

Patented Aug. 24, 1948

2,447,825

UNITED STATES PATENT OFFICE 2,447,825

PRESSURE FLUID SERVOMOTOR

Frank John Tippen, Coventry, England, assignor to Leonard Pelham Lee, Stratford-on-Avon, England Application June 30, 1943, Serial No. 492,887
In Great Britain February 6, 1942

Section 1, Public Law 690, August 8, 1946
Patent expires February 6, 1962

9 Claims. (Cl. 121—38)

When the sleeve of a centrifugal governor is connected to the regulating member of an engine or machine by mechanism having no means of adjustment during working, the regulating member will occupy a definite position for each position of the balls of the governor. The position of the balls of the governor is dependent on the speed of the engine or machine. When a change of speed occurs, in order to return the speed to the initial constant, a new position of the regulator is required in relation to the position of the balls. In other words, the position of the balls at any given speed is the same whatever the load lator is required in relation to the position of the regulating member are required at various loads to keep the speed constant. Thus if the speed is to be returned to the initial constant speed after a change of load and kept there, the mechanism connecting the governor sleeve to the regulating member must be capable of adjustment or correction during working, and some means must be provided for adjusting or correcting it.

Further, when a change of speed occurs, if the mechanism connecting the governor sleeve to the regulator is not capable of adjustment during working, the governor operates to bring the speed back to a constant level which, however, is not the initial constant speed.

Proposals have been made to control engine speed by providing a centrifugal governor mechanically connected to a rotary valve controlling the supply of pressure fluid to a servomotor including a sector shaped chamber in which is disposed a vane mounted for oscillation about the axis of the valve and having a ported boss surrounding the valve.

The present invention relates to governing gear of the type wherein adjusting or correcting mechanism is provided adapted to bring the speed of the engine or machine back to the initial constant.

The object of the present invention is to provide an improved construction.

Referring to the drawings:

Figure 1 is a sectional view in end elevation.
Figure 2 is a section on line 2—2 of Figure 1.
Figure 3 is a section on line 3—3 of Figure 1.
Figure 4 is an external view looking on the inlet end of the pivot.
Figure 5 is a transverse section through the pivot and the parts mounted thereon showing a modification.

In the construction shown, the governor is mounted on a shaft 10, which shaft is provided with an intermediate annular flange 11 disposed between the two parts 12 and 13 of the governor. Both the parts 12 and 13 are keyed to the shaft 10 and rotate therewith. The part 12 is provided with a flat face 14 disposed at right angles to the axis of the shaft 10, and this face as is shown is provided with a number of radial ribs 15 between which balls 16 can roll, the balls being constrained to roll or be displaced radially, that is, have centrifugal and centripetal movement.

The other member 13 is provided with a conical face 17. This face may be of curved contour if desired. The member 13 is adapted to be displaced parallel to the axis of the shaft 10 by the centrifugal action of the balls 16 when the speed causes them to move away from the axis of the shaft 10. The member 13 is adapted to slide in the opposite direction at low speeds when the balls move towards the axis of the shaft 10, this movement of the member 13 being produced by the spring 18 acting on the member 13 and finding abutment between the collar 19, and a shoulder (not numbered) in the member 13.

The shaft 10 is mounted in bearings in an oil-tight casing 20 having one end 21 removable, and having an opening in its base closed by a removable plug 22.

The member 13 forms the governor sleeve and is adapted to reciprocate along the shaft 10 and it is provided with an annular groove 23 in which is disposed one end 24 of the primary lever 25, this lever being adapted to be rocked by movements of the governor sleeve 13.

As will be seen from Figure 1, the lever 25 is provided with a tubular extension 26 mounted for oscillation upon a hollow pivot 27. This hollow pivot 27 is provided with a flange 28 at one end which is secured to a facing 29 on the casing 21. The periphery of the flange 28 (Fig. 4) is provided with three slots, 30, and the casing 21 is provided with three studs 31 on which are placed nuts 32 and washers 33. By slacking off these nuts, the pivot 27 can be given a part turn in either direction about its own axis and can then be refixed by tightening the nuts. This arrangement is not essential, and if desired the pivot 27 may be fixed in relation to the casing 21 so that no angular adjustment is possible. Such an arrangement is shown in Figure 1, which Figure 4 shows the arrangement in which the pivot can be adjusted.

The hollow pivot 27 is provided with an integral transverse partition 34 dividing it into an inlet chamber 35 and a discharge chamber 36.

At the outer end of the inlet chamber the pivot is internally screw threaded as shown at 37 so that a pipe connection can be made thereto.

The discharge from the discharge chamber 36 takes place into the casing 21 and the oil level is maintained by providing a pipe connection 38 at a suitable level.

The inlet part 35 of the hollow pivot is provided with two angularly spaced ports 38 (Fig. 2), and the discharge part 36 of the hollow pivot is provided with a discharge port 40 (Fig. 3).

The boss 26 of the primary lever 25 is provided with a pair of angularly spaced inlet ports 41, (Fig. 2) between which is situated an externally projecting longitudinal vane 42, and the boss 26 is also provided with a pair of discharge ports 43 (see Figure 3) one on either side of the vane 42.

For damping purposes the boss 26 is also provided with a second outwardly projecting vane 44.

The secondary lever is shown at 45 and it was a boss 46 which can oscillate on the end portion of the boss 26 of the primary lever. The boss 46 is provided with a tubular extension 47 which fits over the ported part of the tubular extension 26 and engages the outer edges of the two vanes on fins 42 and 44 of extension 26, so as to form two part-annular chambers 48 and 49, one on each side of the vane 42 and two part-annular chambers 50 and 51, one on each side of the vane 44.

The tubular extension 47 engages in a liquid-tight manner a rabbeted face 52 on the primary lever 25.

The tubular extension 47 is further provided with two angularly spaced inwardly projecting vanes or ribs 53 and 54. The vane 53 is disposed between the part-annular chambers 48 and 50, and the vane 54 is disposed between the part-annular chambers 49 and 51.

The inner end of the pivot 27 is provided with a collar 55 which retains the parts against axial movement.

Mounted in one side of the casing 21 is a pivot pin 56 carrying an internal lever 57 and an external lever 58.

The external lever 58 is connected by a link 59 to a lever 60 controlling the regulating device of the engine or machine which may take the form of a throttle valve 61 as shown.

The internal lever 57 is connected by a link 62 to the end of the secondary lever 45.

When relative angular movement occurs between the levers 25 and 45, it is arranged that liquid or air shall flow from the chamber 50 to the chamber 51 or vice versa, to damp the movement of the secondary lever. The liquid may pass from one chamber to the other by leaking past the vane 44, or the vane 44 may have a small hole drilled through it.

Preferably, however, a by-pass passage 63 is provided in the tubular extension 47, this by-pass passage being controlled by a needle valve 64 locked by a nut 65 and accessible through the opening closed by the plug 22.

In the alternative shown in Figure 5, the ports in the pivot and in the boss of the primary lever and the vanes are duplicated in order to provide for better balancing. In the construction shown in Figure 5 there are two pairs of the ports 41 and two pairs of the ports 39, and there are two vanes 42 arranged directly opposite to each other. Two damping vanes 44 are shown, and the number of the inwardly projecting vanes on the tubular extension 47 is duplicated.

In operation, if the engine or machine experiences a decrease of load and a consequent increase of speed, the balls 16 will move outwardly and will move the governor sleeve 13 to the left (see Figure 2). This action turns the primary lever 25 in an anti-clockwise direction. This motion will be transmitted to the lever 45 by virtue of the fact that the chamber 48 is filled with incompressible liquid. As a further result of the movement of the lever 25 one of the ports 41 uncovers one of the ports 39. When this occurs, one of the ports 43 on the opposite side of the vane 42 will begin to register with the discharge port 40. Pressure liquid therefore flows into the chamber 48 and acts upon the vane 53, thus causing the secondary lever 45 to turn through a bigger angle than that through which the primary lever 25 has moved, so that the lever 60 operating the regulating means of the engine or machine is adjusted to a greater extent than it would be by a simple direct connection from the governor sleeve. The pressure of the liquid in the chamber 48 exerts the same pressure on the vane 42 as on the vane 53 but the load of the governor on the parts 25, 26 and 42 is much greater than the resistance to movement of the means 53, 45, 62, 58 and 61. Consequently, although the pressure in the chamber 48 opposes further movement of the lever 25, it is the vane 53 and the outer member 47 which is rotated.

Movement of the secondary lever 45 continues as long as one of the ports 39 registers with one of the ports 41, and the movement is kept under control by the necessity for oil to pass from the chamber 50 to the chamber 51.

As the speed returns towards the normal, the balls 16 move inwardly towards the axis of the shaft 10, and the governor sleeve 13 moves to the right (Figure 2) under the influence of the spring 18, thus turning the primary lever 25 in a clockwise direction. Eventually the port 41 ceases to register with the port 39 so that pressure fluid is no longer supplied to the chamber 48 and excess angular movement of the secondary lever 45 ceases. The angle between the primary lever 25 and the secondary lever 45 has, however, been adjusted by the mechanism, with the result that the regulating mechanism of the engine or machine is brought to the position required to bring the speed of the engine or machine back to the constant required.

It will readily be understood that if instead of experiencing a decrease of load, the engine or machine experiences an increase of load, an exactly similar series of operations will take place with the balls 16 moving inwardly and the governor sleeve 13 moving to the right as seen in Figure 2. In such circumstances, the angle between the levers 25 and 45 will be increased instead of being decreased.

What I claim then is:

1. A device of the character described, incorporating a hollow ported pivot, the passage through which is divided by a transverse partition into separate inlet and discharge chambers for pressure liquid, the inlet chamber having two angularly spaced ports in its wall, and the discharge chamber having a discharge port in its wall, a primary lever and a secondary lever mounted for movement about a common axis formed by said pivot, the primary lever having a primary tubular ported extension mounted on and surrounding said pivot, and an externally projecting vane arranged longitudinally, said primary extension having a pair of inlet ports one on each side of the vane, said inlet ports cooperating with the ports in the wall of the inlet chamber of the pivot, said primary extension also having a pair of discharge ports one on each side of the vane for cooperating with the discharge port in the wall of the discharge chamber of the pivot, the secondary lever having a tubular extension disposed around said primary tubular ported extension, both tubular extensions having vanes extending across the annular space between them, said pivot being connected to a source of pressure fluid, the primary tubular extension acting as a valve controlling the passage of fluid from the pivot to the space between the vanes.

2. A device of the character described, incorporating a hollow ported pivot, the passage through which is divided by a transverse partition into separate inlet and discharge chambers for pressure liquid, the inlet chamber having two angularly spaced ports in its wall, and the discharge chamber having a discharge port in its wall, a primary lever and a secondary lever mounted for movement about a common axis formed by said pivot, the primary lever having a primary tubular ported extension mounted on and surrounding said pivot, and an externally projecting vane arranged longitudinally, said primary extension having a pair of inlet ports one on each side of the vane, said inlet ports cooperating with the ports in the wall of the inlet chamber of the pivot, said primary extension also having a pair of discharge ports one on each side of the vane for cooperating with the discharge port in the wall of the discharge chamber of the pivot, the secondary lever having a tubular extension disposed around said primary tubular ported extension, both extensions having vanes extending across the annular space between them, said pivot being connected to a source of pressure fluid, the primary tubular ported extension acting as a valve controlling the passage of fluid from the pivot to the space between the vanes for the purpose of producing displacement of the secondary lever angularly in relation to the primary lever.

3. A device of the character described, incorporating a hollow ported pivot, the passage through which is divided by a transverse partition into separate inlet and discharge chambers for pressure liquid, the inlet chamber having two angularly spaced ports in its wall, and the discharge chamber having a discharge port in its wall, a primary lever, and a secondary lever mounted for movement about a common axis formed by said pivot, the primary lever having a primary tubular ported extension mounted on and surrounding said pivot, and an externally projecting vane arranged longitudinally, said primary extension having a pair of inlet ports one on each side of the vane, said inlet ports cooperating with the ports in the wall of the inlet chamber of the pivot, said primary extension also having a pair of discharge ports one on each side of the vane for cooperating with the discharge port in the wall of the discharge chamber of the pivot, the secondary lever having a tubular extension disposed around said primary tubular ported extension, both extensions having vanes extending across the annular space between them, said pivot being connected to said source of pressure fluid, the primary extension acting as a valve controlling the passage of fluid from the pivot to the space between the vanes for the purpose of producing displacement of the secondary lever angularly in relation to the primary lever.

4. A device of the character described incorporating a hollow ported pivot, the passage through which is divided by a transverse partition into separate inlet and discharge chambers for pressure fluid, the inlet chamber having a port for connection to a source of pressure fluid and two angularly spaced ports in its wall, and the discharge chamber having a discharge port in its wall, a primary lever having a tubular ported extension mounted on and surrounding said pivot, and an outwardly projecting vane arranged longitudinally, said extension having a pair of inlet ports one on each side of the vane, said inlet ports being adapted to cooperate with the ports in the wall of the inlet chamber of the pivot, said extension also having a pair of discharge ports one on each side of the vane for co-operating with the discharge port in the wall of the discharge chamber of the pivot, and a secondary lever mounted for oscillation on the extension of the primary lever, the secondary lever having a tubular extension disposed around said first-named tubular ported extension, which secondary extension engages the outer edge of the vane thereon, so that part-annular chambers are formed between the interior of the extension and the exterior of the extension on the primary lever, said secondary extension having a pair of inwardly projecting longitudinal vanes engaging said first-named extension, whereby angular displacement of the primary lever brings one of its ports into register with one of the ports in the inlet portion of the pivot wall and permits access of fluid pressure to the part-annular chamber on one side of the externally projecting vane, said fluid pressure acting on the inwardly projecting vane on the tubular extension and causing the secondary lever to move around the common axis relatively to the primary lever.

5. A device according to claim 4, having means for damping relative angular movements between the primary and secondary levers, comprising an additional externally projecting vane on the boss of the primary lever disposed between an additional pair of inwardly projecting vanes on the tubular extension associated with the secondary lever.

6. A device according to claim 4, having means for damping relative angular movements between the primary and secondary levers, comprising an additional externally projecting vane on the boss of the primary lever disposed between an additional pair of inwardly projecting vanes on the tubular extension associated with the secondary lever, and a by-pass passage in the wall of said extension communicating with the interior of said extension on opposite sides of said additional externally projecting vane and between said additional pair of inwardly projecting vanes on said tubular extension.

7. A device according to claim 4, having means for damping relative angular movements between the primary and secondary levers, comprising an additional externally projecting vane on the boss of the primary lever disposed between an additional pair of inwardly projecting vanes on the tubular extension associated with the secondary lever, a by-pass passage in the wall of said extension communicating with the interior of said extension on opposite sides of said additional externally projecting vane and between said additional pair of inwardly projecting vanes on said tubular extension, and a regulating valve in said by-pass passage.

8. A device of the character described, incorporating a hollow ported pivot, the passage through which is divided by a transverse partition into separate inlet and discharge chambers for pressure liquid, the inlet chamber having two angularly spaced ports in its wall, and the discharge chamber having a discharge port in its wall, means whereby said pivot may be adjusted around its axis and retained in any adjusted position, a primary lever and a secondary lever mounted for movement about a common axis formed by said pivot, the primary lever having a primary tubular ported extension mounted on and surrounding said pivot, and an externally projecting vane arranged longitudinally, said primary extension having a pair of inlet ports one on each side of the vane, said inlet ports cooperating with the ports in the wall of the inlet chamber of the pivot, said primary extension also having a pair of discharge ports one on each side of the vane for cooperating with the discharge port in the wall of the discharge chamber of the pivot, the secondary lever having a tubular extension disposed around said first-named tubular ported extension both extensions having vanes extending across the annular space between them, said pivot being connected to a source of pressure fluid, the first-named extension acting as a valve controlling the passage of fluid from the pivot to the space between the vanes.

9. A device adapted to be operated by fluid pressure comprising an inner tubular member having a transverse partition dividing said member into an inlet chamber and a discharge chamber respectively, said member having openings in the walls thereof at both sides of said partition, a sleeve embracing said member and having diametrically outwardly projecting longitudinal fins, said sleeve being further provided with paired ports in the wall thereof separated by one of said fins, said latter ports being adapted to be brought into communication with the openings in the aforesaid inlet and discharge chambers by rotating one of said members relatively to the other, and an outer substantially tubular member encasing the said sleeve and engaging the outer edges of said fins, said outer member having inwardly projecting diametrical longitudinal ribs engaging the outer walls of said sleeve and disposed substantially at right angles to said fins, the parts being so arranged that fluid under pressure, introduced through the inlet end of the inner tubular member may, by suitable manipulation of the parts, be passed through one of the aforesaid ports into one or the other of the chambers between the sleeve and the outer member defined by the said ribs and fin separating the paired ports, impinge upon one or the other of said ribs, be emitted through the discharge opening and a valved by-pass connecting the chambers formed by the other fin and the ribs.

FRANK JOHN TIPPEN.

REFERENCES CITED

The following references are of record in the file of this patent:

UNITED STATES PATENTS

| Number | Name | Date |
|---|---|---|
| 1,046,443 | Crist | Dec. 10, 1912 |
| 1,125,639 | Bergesen | Jan. 19, 1915 |
| 1,944,700 | Tait | Jan. 23, 1934 |
| 1,947,991 | Jessup | Feb. 20, 1934 |
| 2,239,602 | Gottlieb | Apr. 22, 1941 |
| 2,260,979 | Morin | Oct. 28, 1941 |
| 2,292,805 | Tippen | Aug. 11, 1942 |
| 2,325,009 | Kalin | July 20, 1943 |

FOREIGN PATENTS

| Number | Country | Date |
|---|---|---|
| 13,148 | Great Britain | 1893 |
| 344,077 | Great Britain | Mar. 5, 1931 |